UNITED STATES PATENT OFFICE.

JAMES A. CUTTING, OF BOSTON, MASSACHUSETTS.

IMPROVEMENT IN COMPOSITIONS FOR MAKING PHOTOGRAPHIC PICTURES.

Specification forming part of Letters Patent No. 11,266, dated July 11, 1854.

*To all whom it may concern:*

Be it known that I, JAMES A. CUTTING, of Boston, in the county of Suffolk and State of Massachusetts, have invented certain Improvements in Making Photographic Pictures; and I do hereby declare that the following is a full, clear, and exact description of the principle or character which distinguishes them from all other things before known and of the usual manner of making, modifying, and using the same.

My improvements relate to that class of photographic pictures in which the pictures are obtained upon a prepared film upon the surface of glass or other substance.

The film which I employ is collodion, and in order to insure success the collodion must be prepared after my own process, as follows: Take three ounces (Troy) of pure dry nitrate potassa and pulverize in a clean glass mortar. Add to this two and one-half ounces (fluid measure) of pure sulphuric acid, and stir the mixture with a glass rod. Immerse in this liquid eighty grains of clean dry cotton and knead the mass of cotton in the liquid for about five minutes. Remove the cotton and quickly wash it till every trace of acid is gone, and it must then be dried quickly, for I have discovered that the more rapidly the cotton is dried the more sensitive the collodion; and I have found the best effects produced by displacing the water from the cotton by strong alcohol.

To prepare the collodion, take ten ounces concentrated sulphuric ether (60° Baumé) and mix this with six ounces of ninety-five per cent. alcohol. To this mixture add the prepared cotton in quantity sufficient to make a collodion as thick as it can and yet at the same time flow evenly over the surface of glass. Let it settle clear and decant the solution. In order to excite this collodion, take a deep one-ounce vial, introduce two and one-half grains of bromide of potassium, and add water, drop by drop, to make a saturated solution. In this solution dissolve two and one-half grains of iodide of potassium, then add one ounce of collodion, and shake well. Let it settle clear, and decant for use. The solution must be decanted every day.

In order to make the most sensitive collodion, I dissolve the bromide and iodide of potassium and the collodion in a saturated solution of carbonate of ammonia in water. In using this collodion pour it upon a clean glass plate to form the film in the usual way, and as soon as the collodion has set, and before it becomes dry, immerse the plate in a bath of nitrate of silver made with thirty grains nitrate of silver, two grains iodide of silver, and one ounce of water. Take the plate directly from the bath to the camera, and after sufficient exposure the plate is taken to a darkroom to develop the impression with the following solution: Take pyrogallic acid, four grains; acetic acid, No. 8, one ounce. Dissolve and filter. For use, take of this liquid one and one-half dram diluted with six and one-half drams of water, and when the impression is sufficiently developed pour off the liquid and immerse the plate in a solution of the hyposulphite of soda, four ounces to the pint of water. Wash the plate with pure water, and dry it in the usual way.

The advantages of the above process are the brief time required to produce an impression and the sharpness of the pictures. Portraits can be taken with as much facility as with the daguerreotype, and the pictures are sharp and of excellent tone. The impression thus obtained is negative, and the positive picture is produced in the usual way. I denominate this the "mezzogiaphic" process.

I do not claim the use of alcohol as a desiccating agent, but limit my claim to its special use and purpose, as herein stated.

What I claim as my improvements in the process of obtaining photographic pictures is—

1. Displacing the water from the cotton for this purpose with strong alcohol, as set forth.
2. The employment of bromide of potassium in combination with collodion.

JAMES A. CUTTING.

Witnesses:
T. CAMPBELL,
SAML. GRUBB.